United States Patent
Kang et al.

(10) Patent No.: US 9,661,679 B2
(45) Date of Patent: May 23, 2017

(54) DISPLAY APPARATUS AND CONTROL METHOD OF THE SAME

(71) Applicant: SAMSUNG ELECTRONICS CO., LTD., Suwon-si (KR)

(72) Inventors: Yong-jin Kang, Suwon-si (KR); Ki-hun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/837,186

(22) Filed: Aug. 27, 2015

(65) Prior Publication Data

US 2016/0081135 A1     Mar. 17, 2016

(30) Foreign Application Priority Data

Sep. 12, 2014   (KR) .................. 10-2014-0121337

(51) Int. Cl.
*H04B 7/00*     (2006.01)
*H04W 76/04*    (2009.01)
(Continued)

(52) U.S. Cl.
CPC ............ *H04W 76/04* (2013.01); *H04L 69/14* (2013.01); *H04R 3/00* (2013.01); *H04W 8/005* (2013.01);
(Continued)

(58) Field of Classification Search
CPC ..... H04R 2420/07; H04R 3/00; H04W 12/04; H04W 12/06; H04W 4/008; H04W 76/04; H04W 84/12; H04W 88/06; H04W 8/005
(Continued)

(56) References Cited

U.S. PATENT DOCUMENTS 6,006,106 A     12/1999  Cook et al.
6,336,155 B1 *   1/2002  Ito .................. G06F 3/1293
                                                          710/36
(Continued)

FOREIGN PATENT DOCUMENTS

CN      103747391 A     4/2014
KR   1020120038740 A    4/2012
KR   1020140049365 A    4/2014

OTHER PUBLICATIONS

Search Report dated Dec. 10, 2015, issued by the International Searching Authority in counterpart International Application No. PCT/KR2015/008406.
(Continued)

*Primary Examiner* — Tran H Trinh
(74) *Attorney, Agent, or Firm* — Sughrue Mion, PLLC (57) ABSTRACT

Disclosed is a communication apparatus including: a first communicator configured to connect with an external device by a first communication mode; a second communicator configured to connect with the external device by a second communication mode different from the first communication mode; and a controller configured to control the first communicator to connect with the external device by the first communication mode, control the first communicator to obtain connection information of the second communication mode from the external device, control the second communicator to be connected to the external device by the second communication mode based on the connection information, and control at least one of the first communicator and the second communicator to transmit data to the external device.

20 Claims, 7 Drawing Sheets

(51) Int. Cl.
| | | |
|---|---|---|
| *H04R 3/00* | (2006.01) | |
| *H04W 8/00* | (2009.01) | |
| *H04W 12/04* | (2009.01) | |
| *H04L 29/06* | (2006.01) | |
| *H04W 4/00* | (2009.01) | |
| *H04W 84/12* | (2009.01) | |
| *H04W 88/06* | (2009.01) | |
| *H04W 12/06* | (2009.01) | |

(52) U.S. Cl.
CPC ......... *H04W 12/04* (2013.01); *H04R 2420/07* (2013.01); *H04R 2420/09* (2013.01); *H04R 2499/11* (2013.01); *H04R 2499/15* (2013.01); *H04W 4/008* (2013.01); *H04W 12/06* (2013.01); *H04W 84/12* (2013.01); *H04W 88/06* (2013.01)

(58) Field of Classification Search
USPC ...... 455/41.1, 41.2, 200.1, 221, 177.1, 41.3, 455/411, 83, 556, 11.1, 73; 358/1.15; 709/239; 370/328, 332; 348/705; 367/197
See application file for complete search history.

(56) References Cited

U.S. PATENT DOCUMENTS

| | | | |
|---|---|---|---|
| 7,725,118 B2 | 5/2010 | Yang et al. | |
| 8,126,442 B2 | 2/2012 | Wolfe | |
| 8,553,592 B2 | 10/2013 | Yang | |
| 2001/0002365 A1* | 5/2001 | Minakuchi | H04W 8/005 455/556.2 |
| 2002/0194351 A1* | 12/2002 | Nishimura | H04L 29/06 709/229 |
| 2008/0137879 A1 | 6/2008 | Schwartz et al. | |
| 2009/0103124 A1* | 4/2009 | Kimura | G06F 3/1204 358/1.15 |
| 2010/0150112 A1* | 6/2010 | Lee | H04W 48/16 370/332 |
| 2011/0249620 A1* | 10/2011 | Yu | H04B 7/022 370/328 |
| 2012/0058727 A1 | 3/2012 | Cook et al. | |
| 2013/0065557 A1* | 3/2013 | Zhang | H04W 12/06 455/411 |
| 2013/0137373 A1* | 5/2013 | Choi | H04B 5/0031 455/41.1 |
| 2014/0003617 A1 | 1/2014 | Wang et al. | |
| 2014/0010221 A1* | 1/2014 | Panian | H04W 76/02 370/338 |
| 2014/0065960 A1* | 3/2014 | Gang | H04B 5/0031 455/41.1 |
| 2014/0104990 A1* | 4/2014 | Shim | H04B 11/00 367/197 |
| 2014/0219193 A1 | 8/2014 | Linde et al. | |
| 2014/0247396 A1* | 9/2014 | Ohmae | H04N 21/43615 348/705 |
| 2014/0247759 A1* | 9/2014 | Zhang | H04W 52/0251 370/281 |
| 2014/0308898 A1* | 10/2014 | Lee | H04W 4/008 455/41.3 |
| 2014/0320908 A1* | 10/2014 | Iwauchi | H04L 45/22 358/1.15 |
| 2015/0003630 A1 | 1/2015 | Qian | |
| 2015/0006756 A1* | 1/2015 | Hui | H04L 45/00 709/239 |
| 2015/0067129 A1* | 3/2015 | Hayashi | H04L 12/1827 709/223 |
| 2015/0099467 A1* | 4/2015 | Kang | H04W 8/005 455/41.2 |
| 2015/0103708 A1* | 4/2015 | Kang | H04W 76/023 370/311 |
| 2015/0341976 A1* | 11/2015 | Choi | H04B 5/0031 455/41.1 |
| 2016/0050280 A1* | 2/2016 | Ong | H04L 67/141 709/201 |
| 2016/0164725 A1* | 6/2016 | Wu | H04L 41/0803 713/168 |
| 2017/0012821 A1* | 1/2017 | Sa | H04L 41/0816 |

OTHER PUBLICATIONS

Communication dated Mar. 24, 2016, issued by the European Patent Office in counterpart European Application No. 15182817.5.

* cited by examiner

DISPLAY APPARATUS AND CONTROL METHOD OF THE SAME

CROSS-REFERENCE TO RELATED APPLICATION

This application claims priority from Korean Patent Application No. 10-2014-0121337, filed on Sep. 12, 2014 in the Korean Intellectual Property Office, the disclosure of which is incorporated herein in its entirety by reference.

BACKGROUND

Field

Apparatuses and methods consistent with exemplary embodiments relate to a display apparatus and a control method of the same, and more particularly to a display apparatus, which can exchange data with an external device connected thereto, and a control method of the same.

Description of the Related Art

To listen music, music from a mobile phone may be sent to a Bluetooth speaker or a music source from a display apparatus such as a television (TV) may be transmitted and output to a wireless speaker. To listen higher quality of music, stereo music may be transmitted to one wireless speaker or multi-channel audio data may be transmitted to many wireless speakers. The mobile phone, the display apparatus, the wireless speaker and the like support both Bluetooth and wireless fidelity (Wi-Fi). The settings of the speaker are different between Bluetooth connection and Wi-Fi connection.

A user can listen to music through Bluetooth by Bluetooth connection settings, and listen to music through Wi-Fi by Wi-Fi connection settings. Bluetooth can send stereo music to one speaker, and Wi-Fi can send one music or multi-channel audio data to many speakers. Such two wireless communication standards have been differentially used by users.

If the wireless speaker reproduces audio data received through Wi-Fi or Bluetooth, a user has to differentiate between the connection settings for Wi-Fi and Bluetooth to listen music. Bluetooth has a limit to the number of speakers that can be paired with, but is convenient for a user to transmit audio data to one speaker. If the audio data has to be transmitted to two or more speakers, a user uses a Wi-Fi function.

Like this, the wireless communication standard is determined in accordance with the number of wireless speakers used in listening to music, and it is thus inconvenient for a user to adjust connection settings corresponding to the determined wireless standard.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments may provide a display apparatus, which connects with an external device by a second communication mode by transmitting and receiving connection information for connection with the external device by the second communication mode after connecting with the external device by first communication mode and transmits data to the external device through at least one of the first communication mode and the second communication mode, and a control method of the same.

According to an aspect of an exemplary embodiment, there is provided a communication apparatus including: a first communicator configured to connect with an external device by a first communication mode; a second communicator configured to connect with the external device by a second communication mode different from the first communication mode; and a controller configured to control the first communicator to connect with the external device by the first communication mode, control the first communicator to obtain connection information of the second communication mode from the external device in response to the first communicator being connected to the external device, control the second communicator to be connected to the external device by the second communication mode based on the connection information, and control at least one of the first communicator and the second communicator to transmit data to the external device. Thus, it is possible to connect with the external device by the second communication mode after connecting with the external device by the first communication mode, so that data can be transmitted to the external device without inconvenience of setting the connection settings for the second communication mode.

If it is determined that there are two or more external devices connectable with the communication apparatus, the controller may control the second communicator to transmit the data to the two or more external apparatuses by the second communication mode.

If it is determined that the data has a size greater than a predetermined value, the controller may control the second communicator to transmit the data to the external device by the second communication mode. For example, the first communicator using Bluetooth has a limit to transmit high quality of audio data of which size is greater than a predetermined value, and therefore the high quality audio data having a size greater than the predetermined value is transmitted to the external device through the second communicator using Wi-Fi.

The first communication mode may include Bluetooth, and the second communication mode may include at least one of wireless fidelity (Wi-Fi) direct and indirect connection using a low power wireless device.

The external device may include at least one of an audio device, a speaker and a low power wireless device.

The connection information of the second communication mode may include at least one of authentication information, media access control (MAC) address and device information of the communication apparatus. To connect with the external device by the second communication mode after connecting with the external device by the first communication mode, the communication apparatus transmits at least one of authentication information, media access control (MAC) address and device information to the external device, and the external device transmits approval information to the communication apparatus, thereby connecting with the external device by the second communication mode and being convenient for a user to transmit data to the external device.

The communication apparatus may further include a display, and the controller may control the display to visually indicate that the external device is a connectable external device.

The communication apparatus may further include a display, and the controller may control the display to display a communication state indicating that the external device connects with at least one of the first communicator and the second communicator. Thus, a user can be informed of which communication mode is used in connecting with the external device, signal strength, and the like information needed for transmitting data to the external device, as those pieces of information are displayed.

The communication apparatus may further include a user interface (UI) generator configured to generate a UI, and the controller may control the UI generator to generate the UI that indicates the external device as a device to which the data is transmitted upon being selected. Thus, the user interface (UI) is provided for allowing a user to select the external devices.

The external device is one of a plurality of external devices. If it is determined that there are two or more external devices connectable with the communication apparatus, the controller may control the second communicator to transmit the data to corresponding at least one of the plurality of external devices that has properties matching to properties of the data. For example, if many kinds of speakers are provided as the external devices, there is audio data corresponding to property of each speaker, and the corresponding audio data is determined and transmitted to the each speaker.

According to another aspect of an exemplary embodiment, there is provided a control method of a communication apparatus, the method including: connecting with an external device via a first communication mode by a first communicator; in response to the first communicator and the external device being connected to the external device, obtaining connection information of a second communication mode from the external device, by the first communicator; connecting the second communicator to the external device by the second communication mode based on the connection information; and transmitting data to the external device by at least one of the first communicator and the second communicator.

The transmitting the data may include, if it is determined that there are two or more external devices connectable with the communication apparatus, transmitting the data to the two or more external devices via the second communication mode.

The transmitting the data may include, if it is determined that the data has a size greater than a predetermined value, transmitting the data to the external device via the second communication mode.

The first communication mode may include Bluetooth, and the second communication mode may include at least one of wireless fidelity (Wi-Fi) direct and indirect connection using a low power wireless device.

The external device may include at least one of an audio device, a speaker and a low power wireless device.

The connection information of the second communication mode may include at least one of authentication information, media access control (MAC) address and device information of the communication apparatus.

The method further may include visually indicating that the external device is a connectable external device.

The method further may include displaying a communication state indicating that the external device connects with at least one of the first communicator and the second communicator.

The method may further include a user interface (UI) generator configured to generate a UI that indicates the external device as a device to which the data is transmitted upon being selected.

The external device may be one of a plurality of external devices, and the transmitting the data may include, in response to a determination that there are two or more external devices connectable with the communication apparatus, transmitting the data to corresponding at least one of the plurality of external devices that has properties matching to properties of the data.

According to another aspect of an exemplary embodiment, there is provided a wireless communication device including: a first communicator configured to perform an inquiry process via a first communication mode to discover an external device; a second communicator configured to communicate with the external device via a second communication mode which is different from the first communication mode; and a controller configured to determine a size of transmission audio data, control the first communicator to enter a connection state and transmit the audio data in response to the size being smaller than a predetermined size, and control the second communicator to enter the connection state and transmit the audio data via the second communication mode in response to the size being equal to or larger than the predetermined size.

The controller may be further configured to determine a number of wireless connections to be created to transmit the audio data, and control the second communicator to enter the connection state and transmit the audio data via the second communication mode in response to the number of wireless connections being higher than a predetermined number.

BRIEF DESCRIPTION OF THE DRAWINGS

The above and/or other aspects will be more apparent by describing certain exemplary embodiments, with reference to the accompanying drawings, in which.

DETAILED DESCRIPTION OF EXEMPLARY EMBODIMENTS

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list.

Figure 1:
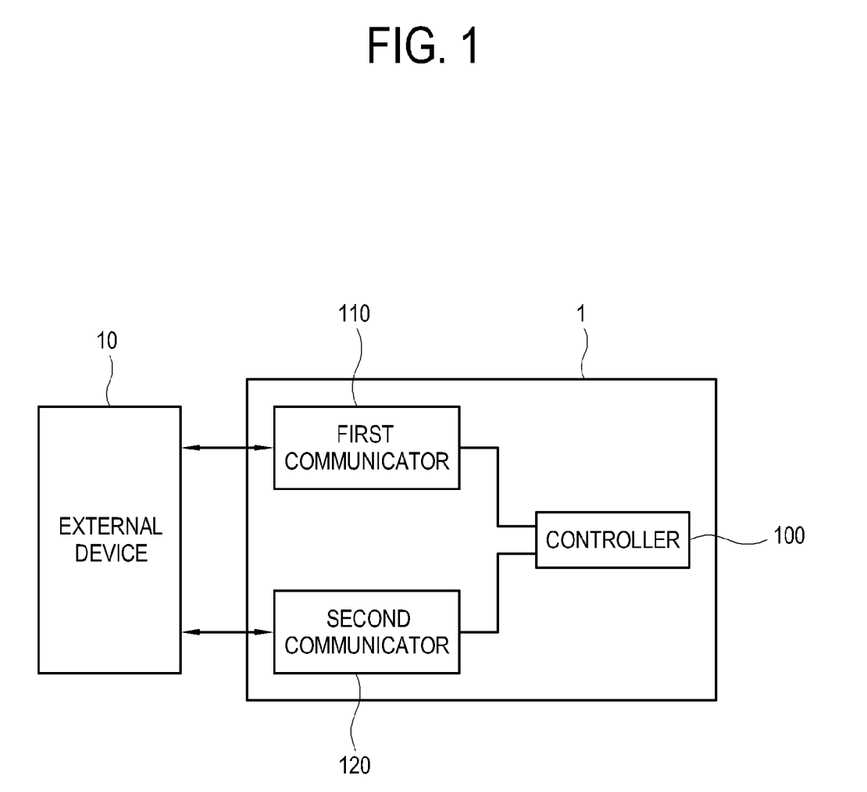
FIG. 1 is a block diagram of a display apparatus according to an exemplary embodiment.

FIG. 1 is a block diagram of a display apparatus 1 (also referred to as a communication apparatus 1) according to an exemplary embodiment. The display apparatus 1 according to an exemplary embodiment may correspond to a Smart phone, a Smart television (TV), a personal computer (PC), etc. The display apparatus 1 according to an exemplary embodiment may include a first communicator 110, a second communicator 120 and a controller 100.

The first communicator 110 and the second communicator 120 may receive a signal from an external device 10 and transmit the signal to a signal processor 140 (see FIG. 2) or the controller 100. The first communicator 110 and the second communicator 120 may connect with various external input cables and receive a signal from a corresponding external input through the cables, or receive a wireless signal through preset wireless communication standards.

The first communicator 110 and the second communicator 120 may include a plurality of connectors to which the respective cables are individually connected. The first communicator 110 and the second communicator 120 may receive a signal from a connected external input, for example, a broadcasting signal, a video signal, a data signal or the like based on standards such as high definition multimedia interface (HDMI), universal serial bus (USB) or Component, or may receive communication data through a communication network.

The first communicator 110 and the second communicator 120 may include not only an element for receiving a signal/data from the external device 10, but also various additional elements such as a wireless communication module for wireless communication or a tuner for tuning a broadcasting signal in accordance with design types of the display apparatus 1. The first communicator 110 and the second communicator 120 may transmit the information/data/signal of the display apparatus 1 to the external device 10 in addition to reception of a signal from the external device 10. That is, the first communicator 110 and the second communicator 120 may receive signals from the external device 10 via wire or wirelessly, and also provide an interface for interactive communication. The first communicator 110 and the second communicator 120 may receive control signals for selecting a user interface (UI) from a plurality of control devices. The first communicator 110 and the second communicator 120 may include communication modules for short-range wireless communication such as Bluetooth, infrared (IR), ultra wideband (UWB), Zigbee, etc., or may include a communication port for wired communication. The first communicator 110 and the second communicator 120 may be used for various purposes of issuing a command for controlling a display, receiving and transmitting data, etc. as well as receiving a control signal for selecting the UI.

The first communicator 110 may support a first communication mode of Bluetooth, and the second communicator 120 may support a second communication mode of Wi-Fi. As an exemplary embodiment, it will be described that the first communicator 110 supports Bluetooth and the second communicator 120 supports Wi-Fi, but the present embodiment is not limited thereto.

The controller 100 may connect the first communicator 110 with the external device 10 by a first communication mode. When the first communicator and the external device are connected, the controller 100 may transmit and receive connection information to be connected to the external device 10 based on the second communication mode through the first communicator 110. The controller 100 may control the second communicator 120 to be connected to the external device 10 by the second communication mode based on the connection information, and transmit data to the external device 10 through at least one of the first communicator 110 and the second communicator 120. The controller 100 connects with the external device 10 through the first communication mode (e.g., Bluetooth mode) and transmits connection information about the second communication mode (e.g., Wi-Fi mode) through the first communication mode. Then, the controller 100 receives approval information about connection through the second communication mode of Wi-Fi from the external device 10, thereby connecting with the external device 10 by the second communication mode. Then, the controller 100 transmits data to the external device 10 through at least one of the first communication mode and the second communication mode.

Figure 2:
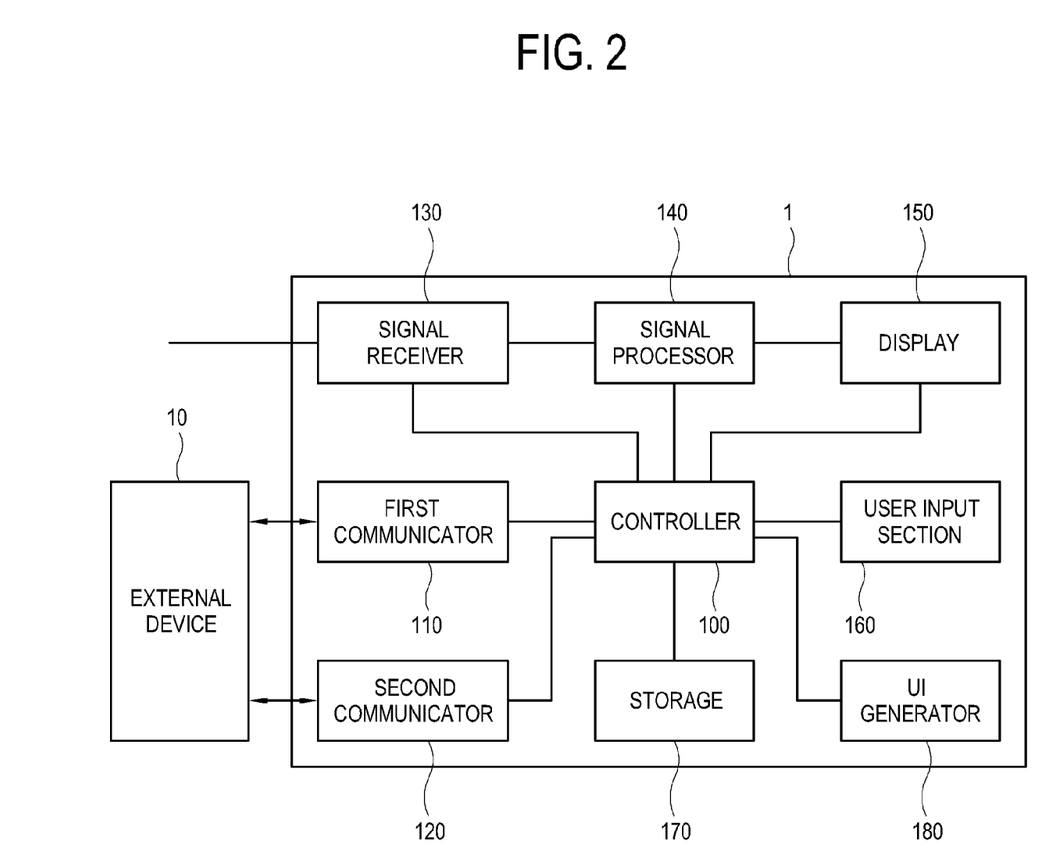
FIG. 2 is a block diagram of a display apparatus according to an exemplary embodiment.

FIG. 2 is a block diagram of a display apparatus according to an exemplary embodiment. The display apparatus 1 according to this exemplary embodiment includes all the elements shown in FIG. 1, and additionally includes a signal receiver 130, a signal processor 140, a display 150, a user input section 160, a storage 170, and a UI generator 180.

The signal receiver 130 may receive at least one of a video signal, a video data, and audio data through a wire or wirelessly, and transmit them to the signal processor 140. For example, the signal receiver 130 receives a broadcasting signal such as a TV broadcasting signal that includes a video signal and/or an audio signal from a broadcasting signal transmitter, or receives a video signal and/or an audio signal from a video device such as a digital versatile disc (DVD) player, a Blu-ray disc (BD) player, etc. The signal receiver 130 may receive a video signal and/or an audio signal from a personal computer (PC), receive a video signal and/or an audio signal from a mobile device such as a Smart phone, a Smart pad, etc., receive a video signal and/or an audio signal through a network such as Internet, etc., or receive video contents stored in a storage medium such as a universal serial bus (USB) storage medium. Alternatively, a video signal and/or an audio signal may be not received through the signal receiver 130, but stored in and provided from the storage 170. The signal receiver 130 may be variously provided corresponding to the formats of the received video and/or audio signal and the types of display apparatus 1. For example, the signal receiver 130 may receive a radio frequency (RF) signal, or receive a video signal and/or an audio signal based on composite video, component video, super video, Syndicat des Constructeurs d'Appareils Radiorécepteurs et Téléviseurs (SCART), high definition multimedia interface (HDMI), DisplayPort, unified display interface (UDI), wireless HD, or the like standards. The signal receiver 130 may further include a tuner to be tuned to a channel corresponding to a broadcasting signal including a video signal and/or an audio signal.

There is no limit to the type of image processing processes performed by the signal processor 140. The image processing processes may for example include de-multiplexing for parsing a predetermined signal into signals corresponding to characteristics, decoding corresponding to image formats of a video signal, de-interlacing for converting a video signal from an interlace type into a progressive type, noise reduction for improving image quality, detail enhancement, frame refresh rate conversion, etc. Further, the signal processor 140 may include a decoder for decoding a source image in accordance with video formats of an encoded source image, and a frame buffer for storing the decoded source image in units of a frame.

The signal processor 140 may be implemented by a system-on-chip where such various functions are integrated or by individual elements capable of independently performing respective processes, and mounted as a video processing board on a printed circuit board and built in the display apparatus 1.

The signal processor 140 performs various preset signal processing processes with regard to the broadcasting signal involving a video signal and/or an audio signal received from the signal receiver 130 and a source image involving a video signal and/or an audio signal provided by the image source. The signal processor 140 outputs a video signal and/or an audio signal, to which such process is applied, to the display 150, so that the source image processed by the signal processor 140 can be displayed on the display 150.

The display 150 may display an image based on the video signal output from the signal processor 140. The display 130 may be implemented using various display types such as liquid crystal, plasma, a light-emitting diode, an organic light-emitting diode, a surface-conduction electron-emitter, a carbon nano-tube and a nano-crystal, but not limited thereto.

The display 150 may include an additional element in accordance with its types. For example, if the display 150 employs the liquid crystal, the display 130 may include a liquid crystal display (LCD) panel, a backlight unit which emits light to the LCD panel, a panel driving substrate which drives the panel.

The display 150 displays an image based a video signal processed by the signal processor 140. There is no limit to the type of display 150 for displaying an image. For example, the type of display 150 may include an LCD, a PDP, an OLED, etc. but not limited thereto. In this case, the display 150 may include an LCD panel, a PDP panel, an OLED panel, etc.

The display 150 may display a process of compensating an image and color. The display 150 may include a display panel on which an image is displayed, and a panel driver which processes an input video signal to be displayed as an image on the display panel, but there is no limit to details of the display 150. A video signal received from an external input source through the signal receiver 130 may undergo decoding, de-interlacing, scaling, or the like image processing process and be then displayed on the display 150.

The user input section 160 may transmit a variety of preset control commands or information to the controller 100 in accordance with a user's control or input. The user input section 160 may include a menu-key or an input panel provided separately from the display apparatus such as, for example, a remote controller that remotely controls the display apparatus 1. Further, the user input section 160 may be incorporated into the display 150. For example, the display 150 may include a touch-screen, a user may touch an input menu displayed on the display 150 so that a preset command can be transmitted to the controller 100.

The user input section 160 may receive a user's motion and voice. A user's motion may include a touch input. The user input section 160 may directly receive a user's motion and voice, or may receive information about a user's motion and voice from the external device 10.

The storage 170 may be implemented by a nonvolatile memory (e.g., a writable read only memory (ROM)) which can retain data even if the display apparatus 1 is powered off and reflect matters changed by a user. That is, the storage 170 may include at least one of a flash memory, erasable programmable read only memory (EPROM) and electrically erasable programmable read only memory (EEPROM).

The UI generator 180 may generate a UI that allows a user to interact with the display apparatus 1 to execute and operate an application program. The generated UI includes a plurality of sub UIs given in the form of icon, text, etc. When a user selects a certain sub UIs through the display apparatus 1, an application program may operate corresponding to the selected sub UI. That is, each sub UI may be generated in units of a plurality of functions or events for operating the application program being executed in the display apparatus 1.

The UI generator 180 refers to a software or hardware function for generating and controlling a UI to be displayed on the display 150, and the function may be performed by the controller 100 (to be described later).

The controller 100 may control a first external device 20 (see FIG. 4) to connect with one of the first communicator 110 and the second communicator 120 and control a second external device 30 (see FIG. 4) to connect with the second communicator 120 if it is determined that there are two or more external devices 10 connectable with the display apparatus 1. If it is displayed that there are two or more external devices 10 connectable with the display apparatus 1 by the first communication mode of the first communicator 110, e.g., by Bluetooth, the first external device 20 and the second external device 30 may connect with the second communicator 120 through the first communicator 110, one of the first external device 20 and the second external device 30 may transmit data through the first communicator 110, and the other external device 10 may transmit data through the second communicator 120. Alternatively, data can be transmitted to the first external device 20 and the second external device 30 through the second communicator 120 without operating the first communicator 110. Also, the controller 100 may transmit data through the first communicator 110 and the second communicator 120 simultaneously.

The first communication mode may include Bluetooth, and the second communication mode may include Wi-Fi direct and at least one of communication modes for indirect connection using a low power wireless device. The first communication mode, for example, Bluetooth, is convenient for a user to connect with the external device 10 but has a limit to the number of external devices that can be paired with at the same time, and it is difficult to transmit data larger than a certain size. Further, the second communication mode, for example, Wi-Fi direct or indirect connection using the low power wireless device, may be difficult and inconvenient for a user to connect with the external device 10, but allows users to transmit data to a plurality of external devices 10 and transmit large size data.

The external device 10 may include at least one of an audio device, a speaker and a low power wireless device.

The connection information of the second communication mode may include at least one of authentication information, media access control (MAC) address and device information of the display apparatus 1. If the display apparatus 1 connects with the external device 10 by the first communication mode, the display apparatus 1 transmits at least one of the authentication information including identification (ID) and a password, product information including MAC address, and the device information including Internet Protocol (IP) information to the external device 10, and the external device 10 transmits approval information to the display apparatus 1. When the display apparatus 1 receives the approval information, the display apparatus 1 and the external device 10 may connect with each other by the second communication mode.

The controller 100 may control a list of connectable external devices 10 to be displayed. The list of external devices 10, which are located within a predetermined distance and connectable with the display apparatus 1, may be displayed on the display 150. At this time, a user may set the display apparatus 1 to automatically connect with the external device 10 that has been connected to the display apparatus 1 once before, and in this case the connectable external devices 10 may not be displayed.

The controller 100 may display a communication state showing that the external device 10 is connected to at least one of the first communicator 110 and the second communicator 120.

The UI generator 180 is further provided to generate a user interface (UI), and the controller 100 may control the UI generator 180 to generate a UI for selecting the external device 10 to which data including audio data may be transmitted. The UI may show the external device 10 together with brief additional explanation.

The controller 100 may transmit data corresponding to the properties of the connected external device 10 to the corresponding external device 10 through at least one of the first communicator 110 and the second communicator 120. In accordance with other exemplary embodiment, if it is determined that there are two or more external devices 10 connectable with the display apparatus 1, the controller 100 may transmit data corresponding to the properties of the connected each of external device 10 to each of the external device 10 through the second communicator 120. For instance, if there are a plurality of speakers which are connectable to the display apparatus 1 and output audio signals having different properties, the controller 100 may transmit audio data to a corresponding one of the plurality of speakers. The controller 100 may compare properties of the audio data and the properties of each of the plurality of speakers, and determine the corresponding speaker based on a result of the comparison. If audio data of high-pitched sound is output to a speaker suitable for outputting audio data of low-pitched sound, an output efficiency and sound quality of the audio data may be deteriorated. Therefore, the audio data is transmitted to the speaker having corresponding properties through at least one of the first communicator 110 and the second communicator 120 to improve sound quality.

Figure 3:
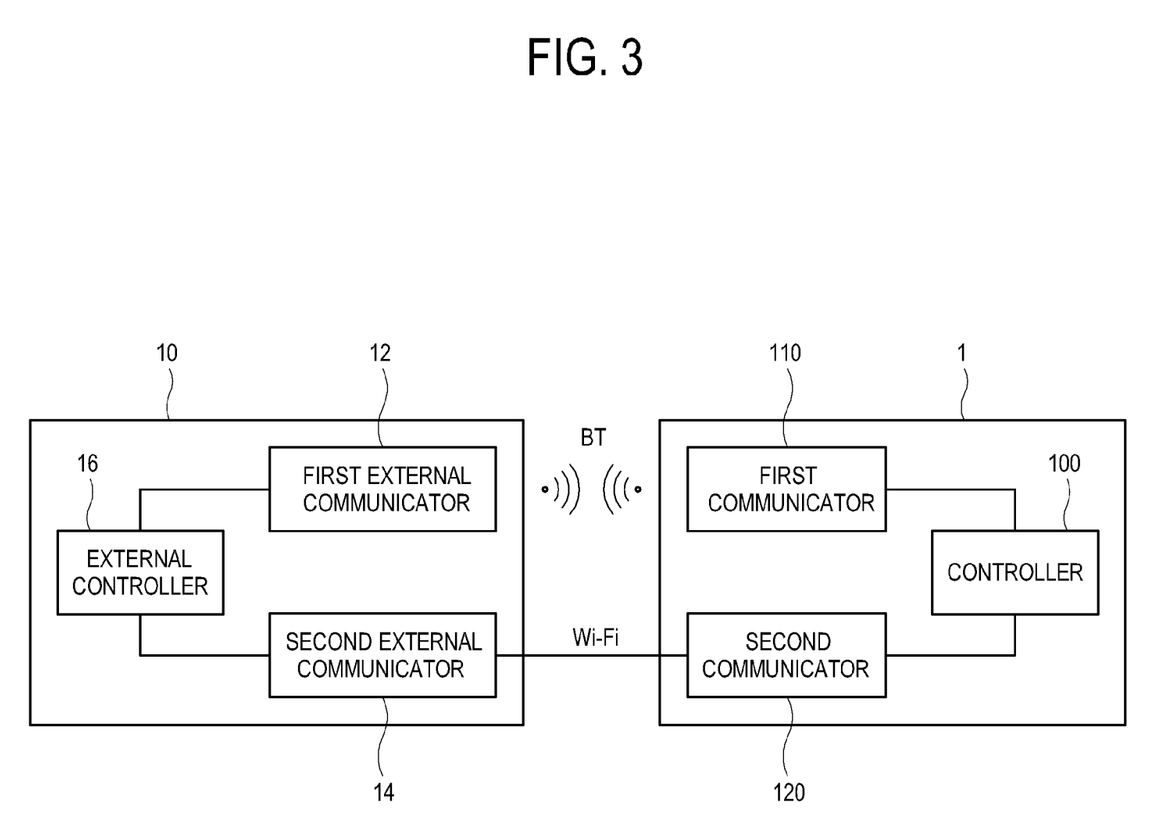
FIG. 3 is a block diagram showing that the display apparatus and an external device are connected according to an exemplary embodiment.

FIG. 3 is a block diagram showing that the display apparatus 1 according to an exemplary embodiment connects with an external device 10.

As shown in FIG. 3, the display apparatus 1 may include the first communicator 110, the second communicator 120, and the controller 100 for controlling the first communicator 110 and the second communicator 120. The external device 10 may include a first external communicator 12 that may communicate via Bluetooth, a second external communicator 14 that may communicate via Wi-Fi, and an external controller 16 that may control the first external communicator 12 and the second external communicator 14. The external device 10 may be one or more speakers around the display apparatus 1 and the controller 110 may discover the external device 10 through the first communication mode of the first communicator 110 (e.g., Bluetooth). To discover the external device 10, the display apparatus 1 may send out an inquiry request, and any device (e.g., the external device 10) listening for such a request may respond with its address and other identification information. If the external device 10 is located within a predetermined area around the display apparatus 1, the external device 10 may be scanned and discovered by Bluetooth and then displayed as a connectable external device on the display 150. If the displayed connectable external device 10 is selected by a user, the selected external device 10 may be connected to the display apparatus 1 by Bluetooth. Alternatively, the external device 10 may be set to scan when the display apparatus 1 is powered on, and connect the scanned external device 10 with the display apparatus 1 by Bluetooth.

In general cases where a display apparatus of the related art connects with the external device 10 by the second communication mode, i.e. Wi-Fi, the display apparatus of the related art has to undergo processes such as scanning, approval, authentication (input of ID and password), etc. through Wi-Fi so that the display apparatus of the related art can connect with the external device 10 by the second communication mode of the second communicator 120, i.e. Wi-Fi. On the other hand, the display apparatus 1 according to an exemplary embodiment sends the external device 10 at least one of the authentication information, MAC address and device information as information for connection using the second communication mode of the second communicator 120, i.e. Wi-Fi when the display apparatus 1 connects with the external device 10 by the first communication mode of the first communicator 110, i.e. Bluetooth, and then receives the approval information about connection through the second communication mode from the external device 10, thereby connecting with the external device 10 by Wi-Fi. By such connection, the display apparatus 1 can transmit data to at least one of the first external communicator 12 and the second external communicator 14 of the external device 10 through at least one of the first communicator 110 and the second communicator 120.

Figure 4:
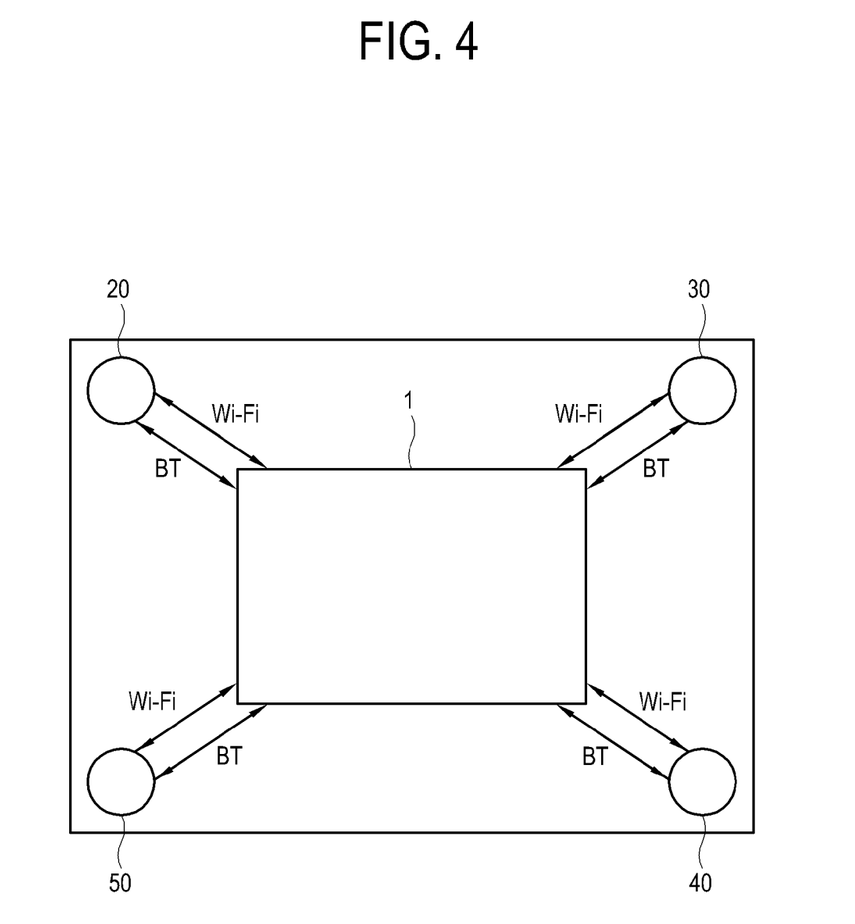
FIG. 4 shows an example showing communications between the display apparatus and an external device according to an exemplary embodiment.

FIG. 4 shows an example showing communications between the display apparatus 1 and an external device according to an exemplary embodiment.

As shown in FIG. 4, the external device 10 of FIG. 3 may be four speakers 20, 30, 40, and 50 connected to a home theater 1 that may correspond to the display apparatus 1 of FIG. 3. For example, the home theater 1 may search for four peripheral speakers 20, 30, 40, and 50 (first, second, third, and fourth external devices 20, 30, 40, and 50) through the first communication mode, i.e. Bluetooth, transmit at least one of authentication information, MAC address and device information of the home theater 1 to the first external device 20 after being connected by Bluetooth, receive approval information from the first external device 20, and connect with the first external device 20 by the second communication mode, i.e. Wi-Fi. Likewise, the home theater 1 connects with the second external device 30, the third external device 40 and the fourth external device 50 by the second communication mode, i.e. Wi-Fi. Thus, audio data may be transmitted to the first external device 20, the second external device 30, the third external device 40 and the fourth external device 50. In accordance with an exemplary embodiment, the audio data may be transmitted to one of the first external device 20, the second external device 30, the third external device 40 and the fourth external device 50 by the first communication mode, i.e. Bluetooth. In accordance with another exemplary embodiment, the display apparatus 1 may transmit the audio data of high quality sound to the external devices 20, 30, 40 and 50 by Wi-Fi at the same time.

Figure 5:
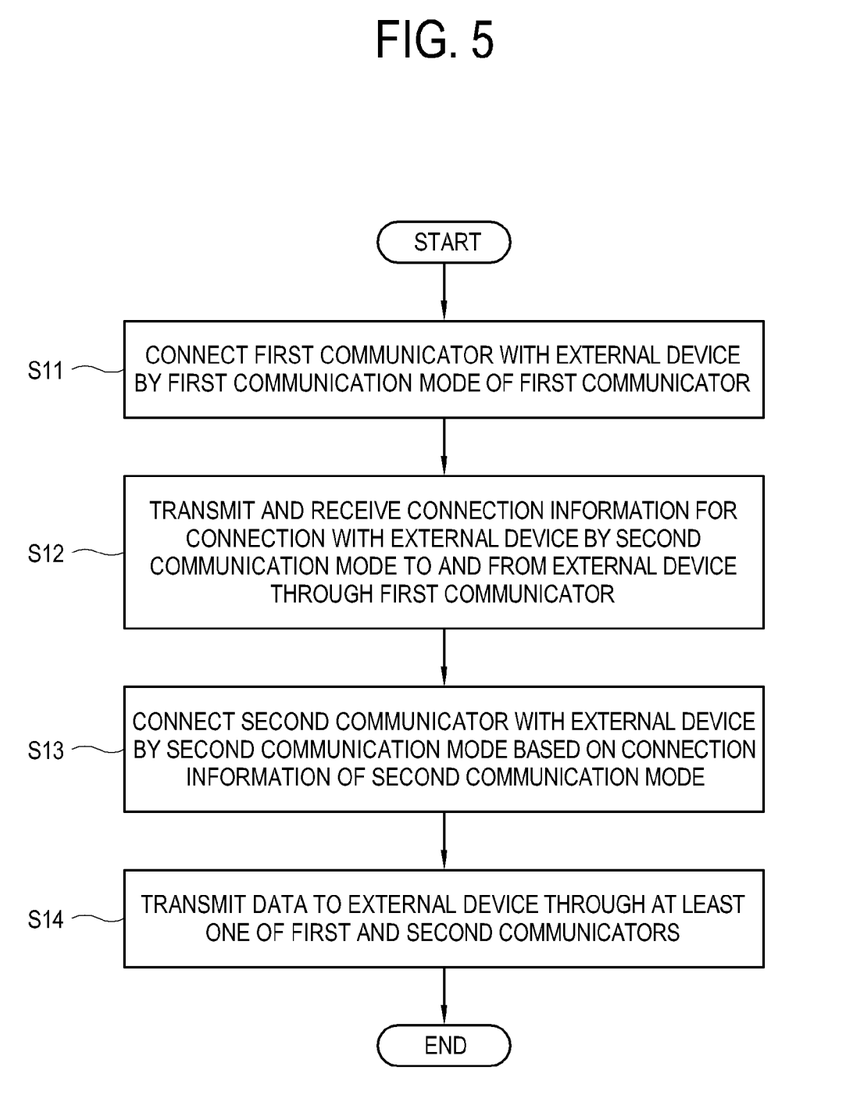
FIG. 5 is a control flowchart showing operations of the display apparatus according to an exemplary embodiment.

FIG. 5 is a control flowchart showing operations of the display apparatus 1 according to an exemplary embodiment.

At operation S11, the first communicator 110 connects with the external device 10 by the first communication mode of the first communicator 110.

At operation S12, in response to the first communicator 110 being connected to the external device 10, connection information for connecting with the external device 10 by the second communication mode may be transmitted to and received from the external device 10 through the first communicator 110.

At operation S13, the second communicator 120 connects with the external device 10 by the second communication mode based on the connection information of the second communication mode.

At operation S14, data is transmitted to the external device 10 through at least one of the first communicator 110 and the second communicator 120.

Figure 6:
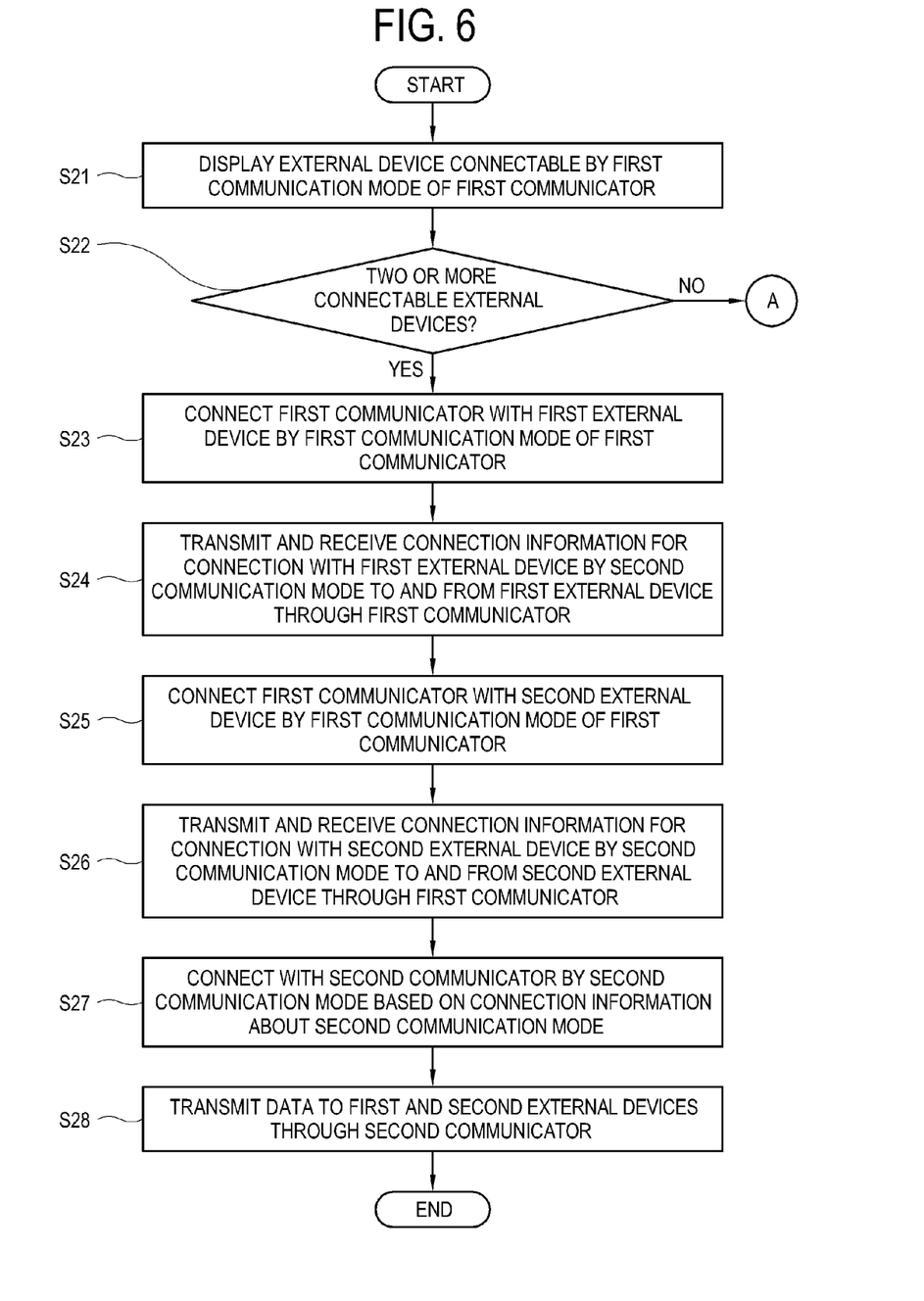
FIG. 6 is a control flowchart showing operations of the display apparatus according to an exemplary embodiment.

FIG. 6 is a control flowchart showing operations of the display apparatus 1 according to an exemplary embodiment.

At operation S21, the external devices 10 connectable by the first communication mode of the first communicator 110 (i.e. Bluetooth) are displayed.

At operation S22, the controller 100 may determine whether there are two or more connectable external devices 10.

If the controller 100 determines that there is not more than one external device 10, the operation moves to Ⓐ.

On the other hand, if the controller 100 determines that there are two or more connectable external devices 10, at operation S23 the first communicator 110 connects with the first external device 20 by the first communication mode of the first communicator 110 (i.e. Bluetooth).

At operation S24, the connection information for connection with the first external device 10 by the second communication mode is transmitted to and received from the first external device 10 through the first communicator 110.

At operation S25, the first communicator 110 connects with the second external device 30 by the first communication mode of the first communicator 110 (i.e. Bluetooth).

At operation S26, the connection information for connection with the second external device 30 by the second communication mode is transmitted to and received from the second external device 30 through the first communicator 110.

At operation S27, the second communicator 120 connects with the second external device 30 by the second communication mode based on the connection information of the second communication mode.

At operation S28, data is transmitted to the first external device 20 and the second external device 30 through the second communicator 120.

Figure 7:
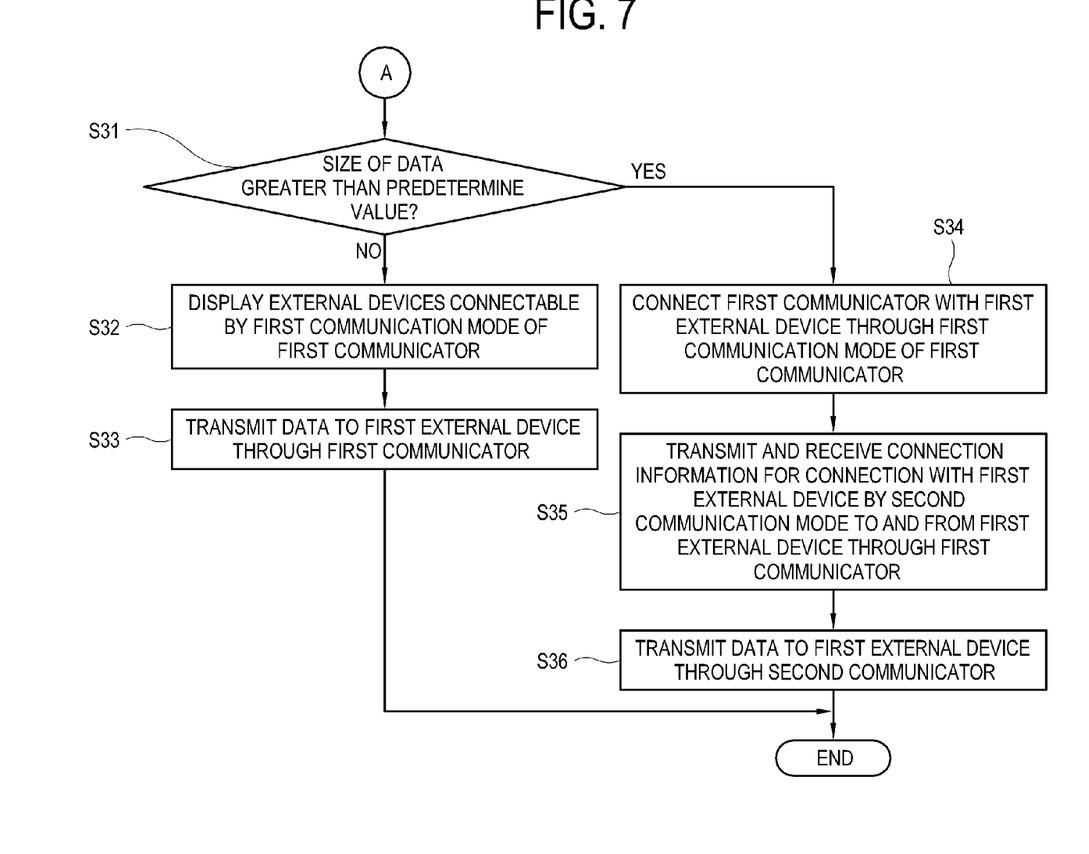
FIG. 7 is a control flowchart showing operations of the display apparatus according to another exemplary embodiment.

FIG. 7 is a control flowchart showing operations of the display apparatus 1 according to another exemplary embodiment.

In the control flowchart of FIG. 6, if it is determined in the operation S22 that there is not more than one connectable external devices 10, at operation 31 the display apparatus 1 determines whether the size of data to be transmitted to the external device 10 is greater than a predetermined value.

If the size of data to be transmitted to the external device 10 is not greater than the predetermined value, at operation S32 the first communicator 110 connects with the external device 10 by the first communication mode of the first communicator 110 (i.e. Bluetooth).

At operation S33, data is transmitted to the external device 10 by the first communicator 110.

At operation S31, if the size of data to be transmitted to the external device 10 is greater than the predetermined level, at operation S34 the first communicator 110 connects with the external device 10 by the first communication mode of the first communicator 110 (i.e. Bluetooth).

At operation S35, connection information for connection with the external device 10 by the second communication mode (i.e. Wi-Fi direct) is transmitted to and received from the external device 10 through the first communicator 110.

At operation S36, data is transmitted to the external device 10 through the second communicator 120.

The operation S31 of the control flowchart of FIG. 7 may follow the operation S22 of the control flowchart of FIG. 6. Since there is a limit to use Bluetooth if data of high quality sound is transmitted to the external device 10, the operation of determining whether the size of data to be transmitted is greater than a predetermined value may be performed anytime before transmitting the data from the display apparatus 1 to the external device 10.

As described above, in the case that the display apparatus 1 transmits data to the external device 10, and the connection information for connection with the external device 10 by the second communication mode (i.e. Wi-Fi) is transmitted to the external device 10 after the connection is first performed by the first communication mode (i.e. Bluetooth), and the approval information is received from the external device 10 so that the display apparatus 1 can automatically connect with the external device 10 by the second communication mode and easily transmit the data to the external device 10.

Specifically, the display apparatus 1 may perform a multi-step process including an inquiry process, a paging or connecting process, and a connection process. The display apparatus 1 may perform the inquiry process to discover the external device 10. The display apparatus 1 may transmit an inquiry request, and any device, for example, the external device 10, listening for such a request may respond to the inquiry request. The external device 10 may transmit a response message including its address, name and other identification information in response to the inquiry request. Then, the display apparatus 1 may perform the paging (connecting) process to create a connection between the display apparatus 1 and the external device 10. After the display apparatus 1 has completed the paging process, it enters the connection state and transmit audio data to the external device 10. According to an exemplary embodiment, the inquiry process and the paging process may be performed by the first communicator 110 via the first communication mode, and the connection process may be performed by the second communication via the second communication mode. Whether the connection process is to be preformed by the first communicator 110 or the second communicator 120 may be determined at operations S22 and S31.

According to an exemplary embodiment, the connection with the external device by the second communication mode is performed after connection with the external device by the easily connectable first communication mode, and it is thus convenient to connect with the external device by the second communication mode.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A communication apparatus comprising:
a first communication interface configured to connect the communication apparatus to an external device in a first communication mode;
a second communication interface configured to connect the communication apparatus to the external device in a second communication mode different from the first communication mode; and
a processor configured to control the first communication interface to connect the communication apparatus to the external device in the first communication mode, control the first communication interface to obtain connection information of the second communication mode from the external device in the first communication mode, control the second communication interface, based on the connection information, to be connected to the external device in the second communication mode, control at least one of the first communication interface and the second communication interface to transmit data, based on at least one of a number of connected external devices and a size of the data to the external device.

2. The communication apparatus according to claim 1, wherein in response to the processor determining that there are two or more external devices connectable with the communication apparatus, the processor controls the second communication interface to transmit the data to the two or more external apparatuses by the second communication mode.

3. The communication apparatus according to claim 1, wherein in response to the processor determining that the data has a size greater than a predetermined value, the processor controls the second communication interface to transmit the data to the external device in the second communication mode.

4. The communication apparatus according to claim 1, wherein the first communication mode comprises Bluetooth, and the second communication mode comprises at least one of wireless fidelity (Wi-Fi) direct and indirect connection using a low power wireless device.

5. The communication apparatus according to claim 1, wherein the external device comprises at least one of an audio device, a speaker and a low power wireless device.

6. The communication apparatus according to claim 1, wherein the connection information of the second communication mode comprises at least one of authentication information, media access control (MAC) address and device information of the communication apparatus.

7. The communication apparatus according to claim 1, further comprising a display, and wherein the processor controls the display to visually indicate that the external device is a connectable external device.

8. The communication apparatus according to claim 1, further comprising a display, and wherein the processor controls the display to display a communication state indicating that the external device connects with at least one of the first communication interface and the second communication interface.

9. The communication apparatus according to claim 1, further comprising a user interface (UI) generator configured to generate a UI,
wherein the processor controls the UI generator to generate the UI that indicates the external device as a device to which the data is transmitted upon being selected.

10. The communication apparatus according to claim 1, wherein the external device is one of a plurality of external devices, and in response to the processor determining that there are two or more external devices connectable with the display apparatus, the processor controls the second communication interface to transmit the data to corresponding at least one of the plurality of external devices that has properties matching to properties of the data.

11. A control method of a communication apparatus, the method comprising:
connecting with an external device via a first communication mode, by a first communication interface;
obtaining connection information of a second communication mode from the external device in the first communication mode, by the first communication interface;
connecting the second communication interface to the external device in the second communication mode based on the connection information;
transmitting data based on at least one of a number of connected external devices and a size of the data to the external device by at least one of the first communication interface and the second communication interface.

12. The method according to claim 11, wherein the transmitting the data comprises, in response to a determination that there are two or more external devices connectable with the communication apparatus, transmitting the data to the two or more external devices via the second communication mode.

13. The method according to claim 11, wherein the transmitting the data comprises, in response to a determination that the data has a size greater than a predetermined value, transmitting the data to the external device via the second communication mode.

14. The method according to claim 11, wherein the first communication mode comprises Bluetooth, and the second communication mode comprises at least one of wireless fidelity (Wi-Fi) direct and indirect connection using a low power wireless device.

15. The method according to claim 11, wherein the external device comprises at least one of an audio device, a speaker and a low power wireless device.

16. The method according to claim 11, wherein the connection information of the second communication mode comprises at least one of authentication information, media access control (MAC) address and device information of the communication apparatus.

17. The method according to claim 11, further comprising visually indicating that the external device is a connectable device.

18. The method according to claim 11, further comprising displaying a communication state indicating that the external device connects with at least one of the first communication interface and the second communication interface.

19. The method according to claim 11, further comprising a user interface (UI) generator configured to generate a UI that indicates the external device as a device to which the data is transmitted upon being selected.

20. The method according to claim 11, wherein the external device is one of a plurality of external devices, and wherein the transmitting the data comprises in response to a determination that there are two or more external devices connectable with the communication apparatus, transmitting the data to corresponding at least one of the plurality of external devices that has properties matching to properties of the data.

* * * * *